(12) United States Patent
Tawara

(10) Patent No.: US 8,055,414 B2
(45) Date of Patent: Nov. 8, 2011

(54) SHIFT CONTROL APPARATUS AND METHOD FOR CONTINUOUSLY VARIABLE TRANSMISSION

(75) Inventor: Masahiro Tawara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 544 days.

(21) Appl. No.: 12/307,833

(22) PCT Filed: Jul. 4, 2007

(86) PCT No.: PCT/IB2007/001847
§ 371 (c)(1),
(2), (4) Date: Jan. 7, 2009

(87) PCT Pub. No.: WO2008/007188
PCT Pub. Date: Jan. 17, 2008

(65) Prior Publication Data
US 2009/0240405 A1    Sep. 24, 2009

(30) Foreign Application Priority Data
Jul. 11, 2006    (JP) .................................. 2006-190377

(51) Int. Cl.
*G06F 17/00* (2006.01)

(52) U.S. Cl. .......................................................... 701/52
(58) Field of Classification Search ............... 701/52–53, 701/62, 64, 93; 477/34–37; 475/27–208
See application file for complete search history.

(56) References Cited

U.S. PATENT DOCUMENTS

| | | | |
|---|---|---|---|
| 6,086,506 A | 7/2000 | Petersmann et al. | |
| 7,670,258 B2 * | 3/2010 | Kamada et al. ................. | 477/77 |
| 7,935,015 B2 * | 5/2011 | Tabata et al. ....................... | 475/5 |
| 7,980,991 B2 * | 7/2011 | Kumazaki et al. ............... | 477/15 |
| 2006/0131094 A1 | 6/2006 | Lankes et al. | |
| 2008/0009388 A1 * | 1/2008 | Tabata et al. ...................... | 477/2 |

FOREIGN PATENT DOCUMENTS

| | | |
|---|---|---|
| DE | 42 39 133 C1 | 12/1993 |
| FR | 2 850 724 A | 8/2004 |
| JP | 09-317863 A | 12/1997 |
| JP | 2005-140174 A | 6/2005 |

* cited by examiner

Primary Examiner — Yonel Beaulieu
(74) Attorney, Agent, or Firm — Kenyon & Kenyon LLP

(57) ABSTRACT

An ECT-ECU executes a program that includes a step of executing a stepped shift control if cruise control is not being executed during sequential shift control (stepped shift control) and a step of executing stepless shift control in response to cruise control being activated during sequential shift control (stepped shift control).

9 Claims, 6 Drawing Sheets

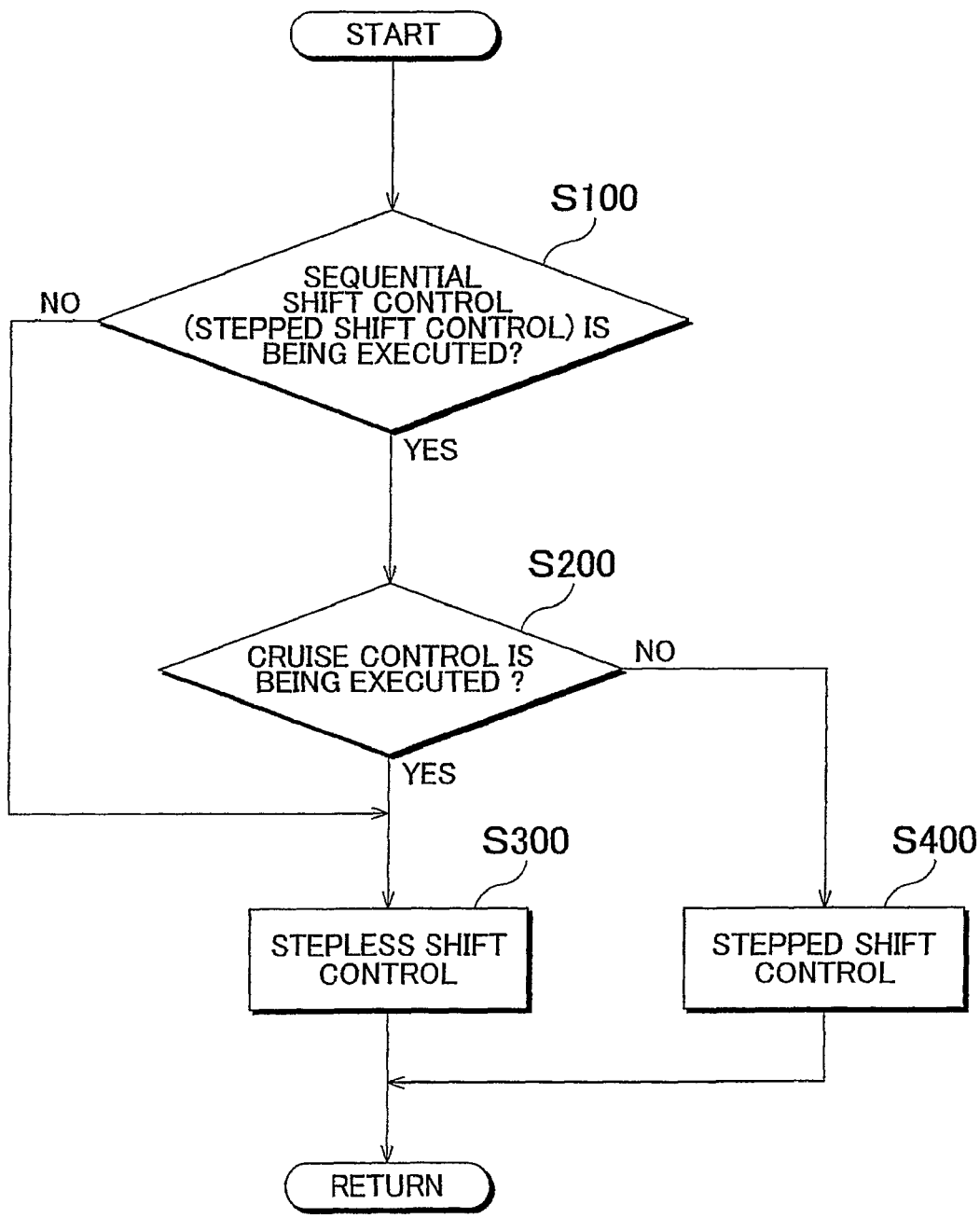

SHIFT CONTROL APPARATUS AND METHOD FOR CONTINUOUSLY VARIABLE TRANSMISSION

This is a 371 national phase application of PCT/IB2007/001847 filed 04 Jul. 2007, claiming priority to Japanese Patent Application No. 2006-190377 filed 11 Jul. 2006, the contents of which are incorporated herein by reference.

FIELD OF THE INVENTION

The invention relates to control of a vehicle with a continuously variable transmission. In particular, the invention relates to control of a vehicle with a continuously variable transmission having a stepped shift mode in which the continuously variable transmission shifts from the present speed to the next speed non-continuously (i.e., stepped shift control including an automatic stepped shift mode that automatically shifts the continuously variable transmission and a manual stepped shift mode that enables the driver to manually shifts the continuously variable transmission).

BACKGROUND OF THE INVENTION

As automatic transmissions for changing the speed ratio according to drive conditions of a vehicle, belt-drive continuously variable transmissions (CVTs) that continuously change the speed ratio are used.

CVTs can make an efficient use of the engine output, which contributes to improving the fuel economy and the drive performance. Some CVTs in practical use have a metal belt and a pair of pulleys and continuously changes the speed ratio by changing the effective diameters of the pulleys through hydraulic actuation. In such CVTs, a metal loop belt is wound around an input pulley (primary pulley) provided on the input shaft and an output pulley (secondary pulley) provided on the output shaft.

The input pulley and the output pulley each have a pair of sheaves and the width of the groove between the sheaves can be changed seamlessly. By changing the groove width, the pitch radius at each of the input and output pulleys (i.e., the distance from the center of the pulley to where the metal loop belt makes contact in the groove between the sheaves) changes, whereby the speed ratio, the ratio between the rotation speed of the input shaft and that of the output shaft, changes continuously.

More specifically, an ECU (Electronic Control Unit) for controlling a CVT determines, based on the accelerator operation amount and the vehicle speed, a target engine output required by the driver, and then determines the target rotation speed of the primary pulley so as to achieve the target engine output on an optimum fuel-economy curve. The ECU then shifts the CVT continuously by controlling the hydraulic control circuit of the CVT such that the actual rotation speed of the primary pulley that is detected by a primary pulley rotation speed sensor equals the target rotation speed. On the other hand, an ECU for controlling the engine controls the engine by determining a target engine torque based on the target engine output and the engine speed and controlling the throttle opening degree accordingly. As such, through such control, CVTs can make an efficient use of the engine output, which contributes to improving the fuel economy and the drive performance.

Some control apparatuses for such CVTs have, as well as the stepless shift mode described above, a manual shift mode that enables, like a manual transmission, the driver to manually shift the CVT among a plurality of predetermined speed steps (stepped shift mode, sequential shift mode).

The speed steps for the manual shift mode correspond to predetermined speed ratios of the CVT. In the manual shift mode, the driver can select any of the speed steps regardless of the vehicle speed and the throttle opening degree.

In a vehicle with a CVT having such a manual shift mode, typically, an upshift "+" switch and a downshift "−" switch are provided as selector switches of the shift lever, and in the manual shift mode, the CVT is manually shifted, like a manual transmission, in response to the shift lever being operated, so that the speed ratio changes non-continuously. Such shift control is also called "sequential shift".

To enable such sequential shift with a CVT, for example, speed ratios (1) to (5) are set in advance to provide five speed steps for the manual shift mode, and the speed ratio (N) of the CVT changes sequentially from one speed ratio to the other among the speed ratios (1) to (5) in response to the upshift "+" switch and the downshift "−" switch being operated via the shift lever. The speed ratios (1) to (5) for the manual shift mode correspond to the gears (1st, 2nd, 3rd, 4th, 5th gears) of a manual transmission.

However, such a manual shift mode of a CVT may cause a problem that the CVT operates in a manner different from that required or expected by the driver. A technology for solving such problem is described in the patent application publication indicated below.

Japanese Patent Application Publication JP-A-2005-140174 describes a control apparatus of a CVT for a vehicle that smoothly switches the shift mode of the CVT from a stepless shift mode to a stepped shift mode without causing uncomfortable feeling of the driver and satisfies the acceleration requests from the driver during the stepped shift mode. This control apparatus controls the speed ratio of the CVT that can continuously changes the speed of rotation output from the internal combustion engine of the vehicle and has a stepless shift mode in which the speed ratio of the CVT continuously change and a stepped shift mode in which the speed ratio of the CVT changes in steps. This control apparatus includes drive condition detecting means for detecting the drive conditions of the vehicle, target speed ratio setting means for setting the target speed ratio in accordance with the detected drive conditions of the vehicle, speed ratio controlling means for controlling the speed ratio of the CVT to the set target speed ratio, shift mode switching means for switching the shift mode between the stepless shift mode and the stepped shift mode, and rotation speed detecting means for detecting the speed of the internal combustion engine. When the shift mode has been switched from the stepless shift mode to the stepped shift mode, the target speed ratio setting means initially uses the speed ratio that was used in the stepless shift mode immediately before the switchover to the stepped shift mode. Then, when the speed of the internal combustion engine reaches a first predetermined value, the target speed ratio setting means changes the target speed ratio to a higher ratio that slows the engine speed down to a second predetermined value that is smaller than the first predetermined value. The drive condition detecting means has throttle opening degree detecting means for detecting the opening degree of the throttle valve of the internal combustion engine. The shift mode switching means prohibits the shift mode to be switched to the stepped shift mode when the opening degree of the throttle valve is decreasing during the stepless shift mode.

According to the CVT control apparatus described above, when the shift mode of the CVT has been switched from the stepless shift mode to the stepped shift mode, the target speed ratio is set to the speed ratio used in the stepless shift mode immediately before the switchover to the stepped shift mode. Therefore, the shift mode of the CVT can be smoothly switched from the stepless shift mode to the stepped shift mode and thus the driver does not feel uncomfortable. Then, if the engine speed increases to the first predetermined value according to the acceleration requests from the driver during the stepped shift mode, the speed ratio of the CVT is then changed to a higher ratio that slows the engine speed down to the second predetermined value that is smaller than the first predetermined value. In this way, as the engine speed increases, the CVT upshifts, so that the engine speed decreases for a moment and then starts increasing again. As such, in the stepped shift mode, the engine speed does not become constant, thereby satisfying the acceleration requests of the driver appropriately. Further, because the shift mode is prohibited to be switched to the stepped shift mode when the opening degree of the throttle valve is decreasing during the stepless shift mode, that is, when the driver does not intend to accelerate the vehicle, the shift mode can be reliably prevented from changing from the stepless shift mode to the stepped shift mode against the driver's intention.

A vehicle has a cruise control system that automatically controls the engine torque and the speed ratio of the automatic transmission so as to maintain the vehicle speed constant without the accelerator pedal being operated by the driver. When the vehicle comes to an uphill slope during cruise control, the speed ratio of the CVT, in order to prevent the vehicle from slowing down, is increased by downshift so that the drive power increases accordingly.

Similar to the above-described manual shift mode, an automatic shift mode is also known, in which a CVT is automatically shifted using, for example, speed ratios (1) to (5) that have been set as five speed steps and based on specific shift conditions defined by, for example, the relation between the vehicle speed and the throttle opening degree and by the relation between the vehicle speed and the engine speed. Hereinafter, such a shift mode will be referred to as "automatic stepped shift mode" to be distinguished from "automatic stepless shift mode" and "manual stepped shift mode". That is, there are three shift modes for the CVT, "automatic stepless shift mode", "automatic stepped shift mode", and "manual stepped shift mode". In the automatic stepless shift mode, the CVT is continuously shifted. In the automatic stepped shift mode, the CVT is shifted in steps. In the manual stepped shift mode, the CVT is manually shifted (shifted by the driver).

In the automatic stepped shift mode, the speed ratio (N) of the CVT sequentially changes among the speed ratios (1) to (5) in response to an upshift condition coming into effect (like when the upshift "+" switch at the shift lever is operated during the manual stepped shift mode) and in response to a downshift condition coming into effect (like when the downshift "−" switch at the shift lever is operated during the manual stepped shift mode).

In such a CVT, however, after the cruise control switch is turned on during the stepped shift control (i.e., the automatic stepped shift mode or the manual stepped shift ode), the CVT repeatedly upshifts and downshifts among the speed ratios set as the speed steps for stepped shifting as the load on the vehicle changes due to, for example, changes in the grade of the road (e.g., uphill slope) on which the vehicle is traveling. Such repeated shifts are generally called "shift hunting". The cause of such shift hunting is as follows. In the stepped shift control (i.e., the automatic stepped shift mode and the manual stepped shift mode), the drive power is controlled using the speed steps of the CVT according to the throttle opening degree, and therefore, depending upon the speed ratios set as the speed steps for the stepped shift control, the required drive power changes frequently whereby shift hunting occurs, making the driver feel uncomfortable. However, this issue is not addressed in JP-A-2005-140174.

DISCLOSURE OF THE INVENTION

It is an object of the invention to provide a shift control apparatus and a shift control method for a continuously variable transmission having a stepped shift mode, which do not make a driver feel uncomfortable during cruise control.

A first aspect of the invention relates to a shift control apparatus for a continuously variable transmission, including: a shift mode switching device that selectively switches the shift mode of the continuously variable transmission between a stepless shift mode and a stepped shift mode in which the continuously variable transmission shifts non-continuously using a plurality of speed steps that are provided as predetermined speed ratios of the continuously variable transmission; a command device that issues commands for upshift and downshift of the continuous variable transmission during the stepped shift mode; a shift control device that, in response to the commands from the command device, controls the continuously variable transmission to shift from the present speed step to the next speed step during the stepped shift control; and a determination device that determines whether a request for a cruise control is being made. The shift mode switching device includes a device that switches the shift mode of the continuously variable transmission from the stepped shift mode to the stepless shift mode in response to a request for the cruise control being made during the stepped shift mode.

According to the shift control apparatus described above, when the cruise control is activated while the continuously variable transmission is operating in the stepped shift mode, the shift mode of the continuously variable transmission is switched from the stepped shift mode to the stepless shift mode. Namely, in the stepped shift mode, the continuously variable transmission non-continuously shifts from one of the speed steps, which are provided as the predetermined speed ratios, to the other. Thus, the continuously variable transmission downshifts from the present speed step to the next lower speed step in response to an increase in the drive power required in the cruise control, and likewise, the continuously variable transmission upshifts from the present speed step to the next higher speed step in response to a decrease in the drive power required in the cruise control. That is, such stepped shifting of the continuously variable transmission during the cruise control makes the driver notice "busy shifts". Therefore, in response to the cruise control being activated during the stepped shift mode, the above-described shift control apparatus switches the shift mode of the continuously variable transmission from the stepped shift mode to the stepless shift mode. Thus, the speed ratio of the continuously variable transmission changes continuously in response to changes in the drive power required in the cruise control, and therefore it is less likely that the driver would notice busy shifts of the continuously variable transmission. Thus, the shift control apparatus does make the driver feel uncomfortable during the cruise control.

The shift control apparatus described above may be such that the shift mode switching device includes a device that switches the shift mode of the continuously variable transmission from the stepped shift mode to the stepless shift mode in response to a request for the cruise control being made during the stepped shift mode, and that switches the shift mode of the continuously variable transmission from the stepless shift mode back to the stepped shift mode in response to the request for the cruise control being cancelled.

According to this structure, in response to the cruise control being activated during the stepped shift mode, the shift control apparatus switches the shift mode of the continuously variable transmission from the stepped shift mode to the stepless shift mode. Thus, the speed ratio of the continuously variable transmission changes continuously in response to changes in the drive power required in the cruise control, and therefore it is less likely that the driver would notice busy shifts of the transmission. Further, when the cruise control is cancelled, the shift control apparatus switches the shift mode from the stepped shift mode to the automatic shift mode, so that the driver can restart driving with the continuously variable transmission shifting in steps in response to the driver's operations (the operation of the accelerator pedal, the operation of the brake pedal, the operation of the shift lever).

In the shift control apparatus described above, the command device may include a device that issues commands for upshift and downshift of the continuously variable transmission based on a predetermined condition, regardless of manual operations by the driver.

This structure solves the problem of execution of the cruise control in the automatic stepped shift mode in which the continuously variable transmission upshifts and downshifts regardless of shift operations of the driver.

In the shift control apparatus described above, the command device may include a device that issues commands for upshift and downshift of the continuously variable transmission based on manual operations by the driver.

This structure solves the problem of execution of the cruise control in the manual stepped shift mode in which the continuously variable transmission upshifts and downshifts in response to shift operations by the driver.

A second aspect of the invention relates to a shift control apparatus for a continuously variable transmission, including: a shift mode switching device that selectively switches the shift mode of the continuously variable transmission between a stepless shift mode and a stepped shift mode in which the continuously variable transmission shifts non-continuously using a plurality of speed steps that are provided as predetermined speed ratios of the continuously variable transmission; a command device that issues commands for upshift and downshift of the continuous variable transmission during the stepped shift mode; a shift control device that, in response to the commands from the command device; controls the continuously variable transmission to shift from the present speed step to the next speed step during the stepped shift control; and a determination device that determines whether a request for a cruise control is being made. The shift mode switching device includes a device that, in response to a request for a cruise control being made, changes the speed ratios of the speed steps so as to be closer to each other according to a target vehicle speed of the cruise control.

A third aspect of the invention relates to a shift control method for a continuously variable transmission, including: a step of selectively switching the shift mode of the continuously variable transmission between a stepless shift mode and a stepped shift mode in which the continuously variable transmission shifts non-continuously using a plurality of speed steps that are provided as predetermined speed ratios of the continuously variable transmission; a step of issuing commands for upshift and downshift of the continuous variable transmission during the stepped shift mode; a step of controlling, in response to the commands, the continuously variable transmission to shift from the present speed step to the next speed step during the stepped shift control; a step of determining whether a request for a cruise control is being made; and a step of switching the shift mode of the continuously variable transmission from the stepped shift mode to the stepless shift mode in response to a request for the cruise control being made during the stepped shift mode.

A third aspect of the invention relates to a shift control method for a continuously variable transmission, including: a step of selectively switching the shift mode of the continuously variable transmission between a stepless shift mode and a stepped shift mode in which the continuously variable transmission shifts non-continuously using a plurality of speed steps that are provided as predetermined speed ratios of the continuously variable transmission; a step of issuing commands for upshift and downshift of the continuous variable transmission during the stepped shift mode; a step of controlling, in response to the commands, the continuously variable transmission to shift from the present speed step to the next speed step during the stepped shift control; a step of determining whether a request for a cruise control is being made; and a step of changing, in response to a request for a cruise control being made, the speed ratios of the speed steps so as to be closer to each other according to a target vehicle speed of the cruise control.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 6 is a view illustrating the control algorithm of a program executed by the ECU in the exemplary embodiment of the invention.

DETAILED DESCRIPTION OF THE EXEMPLARY EMBODIMENTS

Hereinafter, an exemplary embodiment of the invention will be described with reference to the drawings. In the following, like elements and components will be denoted by like numerals. Also, because their names and functions are the same as each other, detailed descriptions on the like elements and components will not be repeated.

To begin with, the powertrain of a vehicle incorporating a control apparatus according to an exemplary embodiment of the invention will be described with reference to FIG. 1. The control apparatus of this exemplary embodiment is constituted by an ECU 1000 shown in FIG. 1. In this exemplary embodiment, a belt-drive continuously variable transmission is used as an automatic transmission. However, note that applications of the control apparatus of this exemplary embodiment are not limited to any specific belt-drive continuously variable transmissions including those configured as described below.

Figure 1:
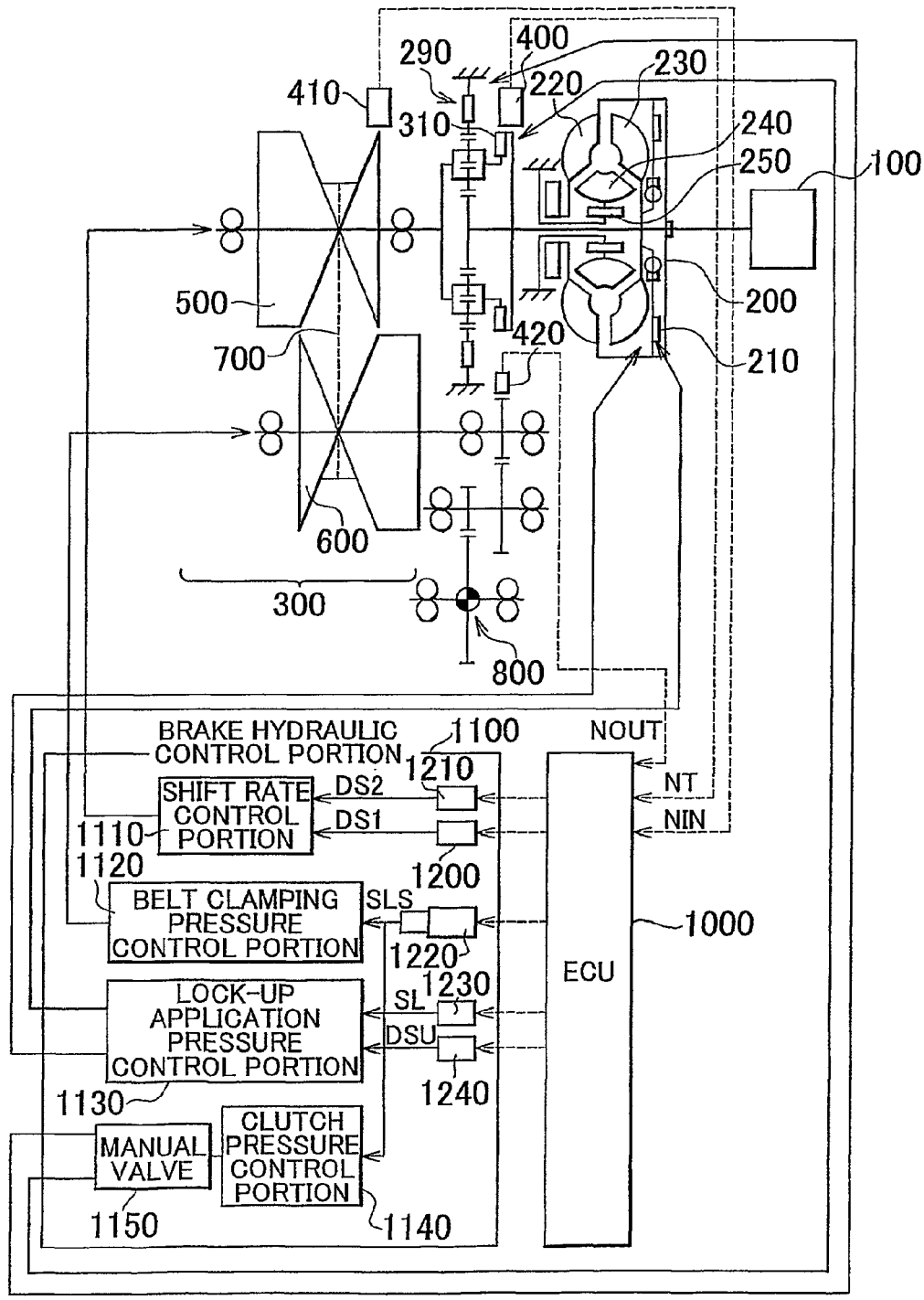
FIG. 1 is a block diagram showing the configuration of an automatic transmission according to an exemplary embodiment of the invention.

Referring to FIG. 1, the powertrain of the vehicle includes an engine 100, a torque converter 200, a forward-reverse drive switching device 290, a belt-drive continuously variable transmission (CVT) 300, a differential gear 800, the ECU 1000, and a hydraulic control portion 1100. The CVT 300 has a stepless shift mode and a stepped shift mode(s). In the stepless shift mode, the speed ratio is continuously changed using the stepless shift function of the CVT 300. On the other hand, the stepped shift mode only uses predetermined speed ratios of the CVT 300 that have been set as a plurality of speed steps (e.g., five speed steps). This stepped shift mode may either be a manual stepped shift mode in which the CVT 300 is manually shifted from the present speed step to the other or an automatic stepped shift mode in which the CVT 300 is shifted automatically (regardless of the requirements from the driver) from the present speed step to the other based on shift conditions that have been determined based on the relation between the vehicle speed and the accelerator operation amount and the relation between the vehicle speed and the engine speed. Note that the CVT 300 may have, in addition to the stepless shift mode, only the manual stepped shift mode, only the automatic stepped shift mode, or both of them. That is, in this exemplary embodiment, the CVT 300 has the three shift modes: the stepless shift mode, the automatic stepped shift mode, and the manual stepped shift mode).

As such, the control apparatus of the CVT 300 may be applied to three types of CVTs: (i) CVTs having a stepless shift mode and an automatic stepped shift mode, (ii) CVTs having a stepless shift mode and a manual stepped shift mode, and (iii) CVTs having a stepless shift mode, an automatic stepped shift mode, and a manual stepped shift mode.

The output shaft of the engine 100 is connected to the input shaft of the torque converter 200. More specifically, the engine 100 and the torque converter 200 are coupled with each other via a rotational shaft. Therefore, the rotation speed NE of the output shaft of the engine 100 (engine speed NE) that is detected by an engine speed sensor and the rotation speed of the input shaft of the torque converter 200 (pump rotation speed) are equal to each other.

The torque converter 200 involves a lock-up clutch that directly connects the input shaft and the output shaft of the torque converter 200 as needed, a pump impeller 220 that is provided on the input shaft side, a turbine impeller 230 that is provided on the output shaft side, a one-way clutch 250, and a stator 240 that causes torque amplification at the torque converter 200. The torque converter 200 and the CVT 300 are connected to each other via rotational shafts. A turbine speed sensor 400 detects the rotation speed NT of the output shaft of the torque converter 200 (turbine speed NT).

The CVT 300 is connected to the torque converter 200 via the forward-reverse drive switching device 290. The CVT 300 has a primary pulley 500 that is provided on the input side, a secondary pulley 600 that is provided on the output side, and a metal belt 700 that is wound around the primary pulley 500 and the secondary pulley 600. The primary pulley 500 are composed of a stationary sheave that is fixed on a primary shaft and a movable sheave that is supported on the primary shaft such that the movable sheave can slide on the primary shaft but can not make any other movements. Likewise, the primary pulley 600 are composed of a stationary sheave that is fixed on a secondary shaft and a movable sheave that is supported on the secondary shaft such that the movable sheave can slide on the secondary shaft but can not make any other movements. A primary pulley rotation speed sensor 410 detects the rotation speed NIN of the primary pulley 500, a secondary pulley rotation speed sensor 420 detects the rotation speed NOUT of the secondary pulley 600.

The primary pulley rotation speed sensor 410 and the secondary pulley rotation speed sensor 420 are arranged so as to face rotation speed detection gears that are attached on the rational shafts of the primary pulley 500 and the secondary pulley 600 or on other rotational shafts connected to the rational shafts of the primary pulley 500 and the secondary pulley 600. The primary pulley rotation speed sensor 410 and the secondary pulley rotation speed sensor 420 are sensors that can detect even slight turns of the primary pulley 500, which serves the input member of the CVT 300, and the secondary pulley 600, which serves as the output member of the CVT 300. The primary pulley rotation speed sensor 410 and the secondary pulley rotation speed sensor 420 are, for example, so-called semiconductor sensors using magnetoresistive elements.

The forward-reverse drive switching device 290 involves a double-pinion type planetary gearset, a reverse brake B1 (for reverse-drive), and an input clutch 310. The planetary gearset has a sun gear that is coupled with the input shaft of the forward-reverse drive switching device 290, a carrier CR on which a first pinion P1 and a second pinion P2 are supported and which is coupled with the stationary sheave of the primary pulley 500, and a ring gear R that is coupled with the reverse brake B1 that is a friction coupling device used for reverse drive. The input clutch 310 is arranged between the carrier CR and the ring gear R. The input clutch 310 is also known as "forward-drive clutch" or as "forward clutch", and is kept applied in any forward-drive ranges of the CVT 300, that is, except when the CVT 300 is in the parking range ("P" range), in the reverse-drive range ("R" position"), and in the neutral range ("N" range). Note that, as mentioned above, the transmissions that can be controlled by the control apparatus of this exemplary embodiment are not limited to belt-drive continuously variable transmissions configured as described above.

Next, the ECU 1000 and the hydraulic control portion 1100 that are used to control the foregoing powertrain will be described with reference to FIG. 2.

Figure 2:
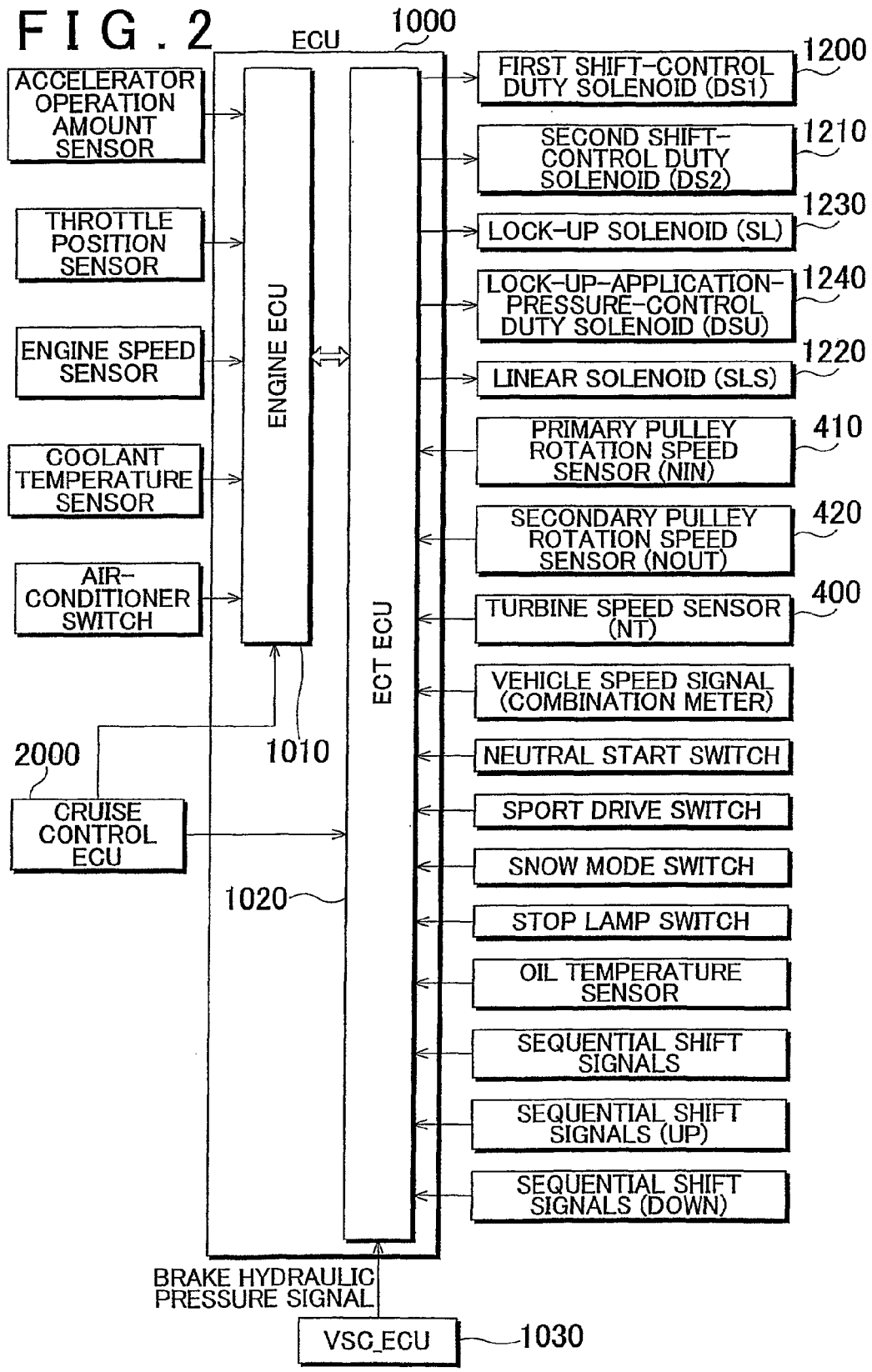
FIG. 2 is a view illustrating detail of the structure of the ECU shown in FIG. 1.

Referring to FIG. 2, an ECT-ECU 1020 receives signals indicating the turbine speed NT from the turbine speed sensor 400, signals indicating the primary pulley rotation speed NIN from the primary pulley rotation speed sensor 410, and signals indicating the secondary pulley rotation speed NOUT from the secondary pulley rotation speed sensor 420.

Referring to FIG. 1 and FIG. 2, the hydraulic control portion 1100 includes a shift rate control portion 1110, a belt clamping pressure control portion 1120, a lock-up application pressure control portion 1130, a clutch pressure control portion 1140, and a manual valve 1150. The ECU 1000 outputs control signals to a first shift-control duty solenoid (DS1) 1200, a second shift-control duty solenoid (DS2) 1210, a belt-clamping-pressure-control linear solenoid (SLS) 1220, a lock-up solenoid (SL) 1230, and a lock-up-application-pressure-control duty solenoid (DSU) 1240, which are all provided in the hydraulic control portion 1100. Detail of the configuration of this hydraulic circuit is described in Japanese Patent Application Publication JP-A-2002-181175, and therefore the configuration of the hydraulic control portion 1100 is not described in detail in this specification.

In the following, the configuration of the ECU 1000 for controlling the above-described powertrain will be described in more detail with reference to FIG. 2. As shown in FIG. 2, the ECU 1000 includes an engine ECU 1010 for controlling the engine 100, the ECT-ECU (Electronic Controlled Automatic Transmission ECU) 1020 for controlling the CVT 300, and a VSC-ECU (Vehicle Stability Control ECU) 1030.

As well as the input and output signals shown in FIG. 1, the ECT-ECU 1020 receives signals from a stop lamp switch which indicate the brake pedal being depressed by the driver, and signals from a G-sensor which indicate an uphill slope grade when the vehicles stops on an uphill slope, etc. On the other hand, the engine ECU 1010 receives signals from an accelerator operation amount sensor which indicate the amount that the driver is depressing the accelerator pedal, signals from a throttle position sensor which indicate the opening degree of an electromagnetic throttle valve, and signals from the engine speed sensor which indicate the speed of the engine 100 (engine speed NE). The engine ECU 1010 and the ECT-ECU 1020 are connected to each other.

Further, the ECT-ECU 1020 receives brake-pressure signals from the 1030 which indicate the hydraulic pressure for the brakes.

In the hydraulic control portion 1100, the belt clamping pressure control portion 1120 adjusts the clamping pressure of the belt 700 of the CVT 300 in accordance with the control signals that the ECT-ECU 1020 outputs to the belt-clamping-pressure-control linear solenoid (SLS) 1220. The clamping pressure of the belt 700 is the contact pressure between the belt 700 and each of the pulleys 500, 600.

Figure 3:
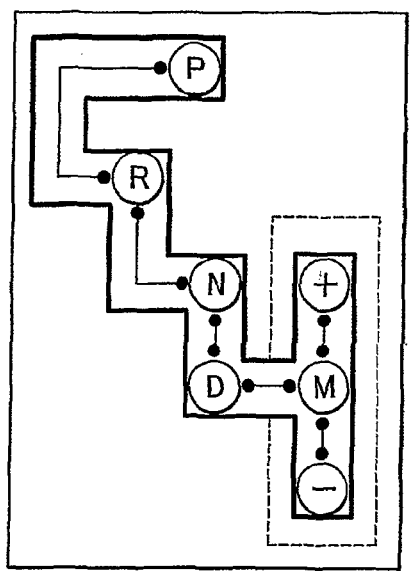
FIG. 3 is a view showing a sequential shift pattern.

Further, sequential shift signals are input to the ECT-ECU 1020. The vehicle in this exemplary embodiment incorporates a sequential shift mechanism having a sequential shift pattern as shown in FIG. 3. The sequential shift mechanism enables the driver to manually change the speed step by shifting the shift lever to the "M" position that is provided beside the "D" position and then shifting the shift lever to the "+" position or to the "−" position. Pushing the shift lever to the "+" position makes an upshift and pulling the shift lever to the "−" position makes a downshift. Note that, as opposed to the arrangement shown in FIG. 3, the "+" position may be provided on the rear side of the "M" position and the "−" position may be provided on the front side of the "M" position. When the shift lever is pushed to the "+" position, a sequential shift signal (upshift) is input to the ECT-ECU 1020. Likewise, when the shift lever is pulled to the "−" position, a sequential shift signal (downshift) is input to the ECT-ECU 1020. When the shift lever is in the "D" position, the CVT 300 operates in the stepless shift mode, not in the manual stepped shift mode. The sequential shift signals also include shift signals output from shift switches that are called "paddle switches", as well as those output from the shift lever (upshift and downshift signals). Meanwhile, if the shift lever is shifted to the "M" position provided beside the "D" position and kept in the "M" position without being pushed and pulled therefrom, it activates the automatic stepped shift mode. Note that a switchover between the stepless shift mode and the automatic stepped shift mode may be made by means of a switch for activating the automatic stepped shift mode or automatically as will later be described with reference to FIG. 5.

Further, the engine ECU 1010 and the ECT-ECU 1020 receive control signals from a cruise control ECU 2000.

The cruise control ECU 2000 requires the engine ECU 1010 to control the output torque of the engine 100 such that the vehicle travels at a constant speed without the accelerator pedal being operated by the driver.

With regard to the control of the engine 100 and the CVT 300 in the vehicle of this exemplary embodiment, the ECU 1000 controls the output torque of the engine 100 and the speed ratio of the CVT 300 so as to produce a target drive torque (positive or negative torque) that is determined based on the amount that the driver operates the accelerator pedal, vehicle drive conditions, or the like. Such power output control is generally termed "drive power control", and this "drive power control" includes control methods known as "drive-power-demand type control", "torque-demand type control", and so on.

In "torque-demand type" engine control, a target engine torque is calculated based on the accelerator operation amount, the engine speed, and external loads, and the fuel injection amount and the intake air amount are controlled in accordance with the calculated target engine torque. Also, the fuel injection amount and the intake air amount are controlled in accordance with the target engine torque set by the cruise control ECU 2000.

When such torque-demand type control is actually executed, the target engine torque is calculated by adding loss torque, including the frictional loss torque that occurs in the engine 10 and in the powertrain system (e.g., the torque converter 200, the CVT 300), to the required output torque, and the fuel injection amount and the intake air amount are then controlled so as to achieve the target engine torque thus calculated.

According to such torque-demand type control, because engine torque, which is a physical amount that has direct effect on vehicle control, is used as a control reference value, it is possible to maintain steady drive feeling and thereby improve the vehicle driveability.

In a vehicle using such torque-demand type engine control, cruise control functions to assist the driver in driving the vehicle.

Next, a description will be made of a shift map for the stepless shift mode of the CVT 300. The shift map for the stepless shift mode is a map that is defined by the vehicle speed on the horizontal axis, the target input rotation speed of the primary pulley 500 on the vertical axis, and the acceleration operation amount as a parameter.

Using the accelerator operation amount as a parameter, this shift map defines the relation between the vehicle speed and the primary pulley rotation speed NIN (target value) at each level of the acceleration operation amount over the entire range of the speed ratio of the CVT 300 from the lowest to the highest.

This shift map is formulated so as to determine the target engine output required by the driver based on the acceleration operation amount and the vehicle speed and to determine the target input rotation speed of the 500 so as to achieve the target engine output on an optimum fuel-economy curve. According to this map, the larger the acceleration operation amount, the higher the speed ratio of the CVT 300 is made.

In the shift control of the CVT 300, the target input rotation speed of the primary pulley 500 is set based on specific information, such as the acceleration operation amount and the vehicle speed, such that the speed ratio of the CVT 300 changes to the target speed ratio at a desired rate (within a desired time). Then, the ECT-ECU 1020 outputs control signals to the first shift-control duty solenoid (DS1) 1200 and to the second shift-control duty solenoid (DS1) 1210 so that the rotation speed detected by the primary pulley rotation speed sensor 410 equals the target input rotation speed of the primary pulley 500. That is, the speed ratio of the CVT 300 is optimized so that the rotation speed detected by the primary pulley rotation speed sensor 410 equals the target input rotation speed of the primary pulley 500.

The first shift-control duty solenoid (DS1) 1200 controls the rate of increase in the speed ratio by controlling the flowrate of the line pressure hydraulic fluid to be supplied to the primary pulley 500, and the second shift-control duty solenoid (DS2) 1210 controls the rate of decrease in the speed ratio by controlling the flowrate of the line pressure hydraulic fluid to be discharged from the primary pulley 500.

Next, a shift map for the automatic stepped shift control of the CVT 300 will be described with reference to FIG. 4. Here, it is assumed that the automatic stepped shift mode has been activated by the shift lever being shifted to and kept in the "M" position beside the "D" position.

Figure 4:
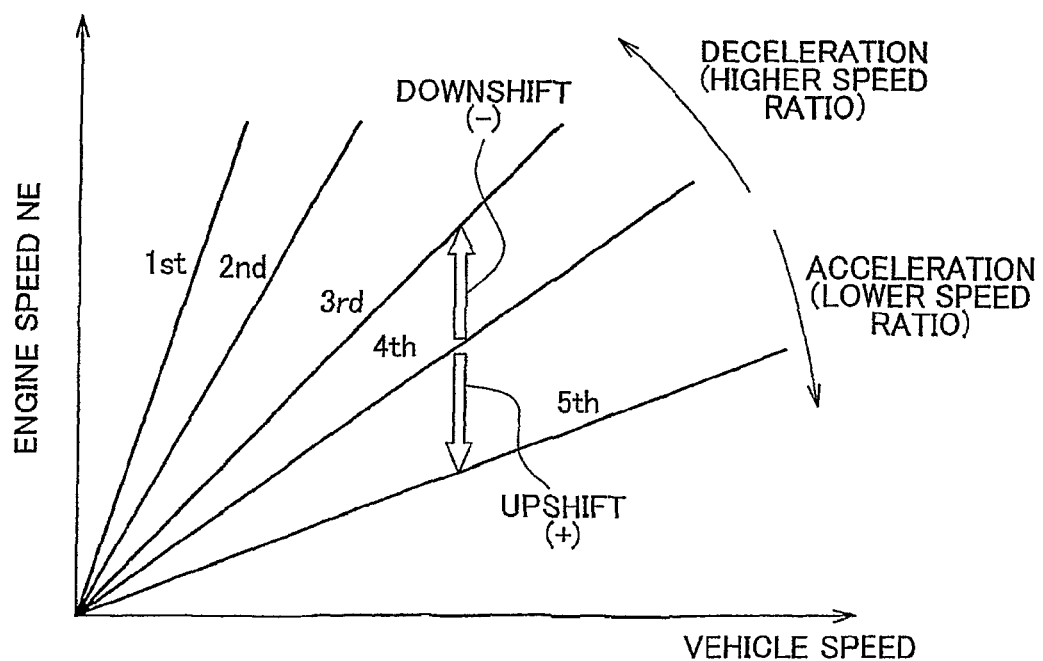
FIG. 4 is a shift map (for automatic stepped shift mode) stored in the ECU in the exemplary embodiment of the invention.

In the map in FIG. 4, the horizontal axis represents the vehicle speed and the vertical axis represents the speed of the engine 100. As is evident from FIG. 4, in this exemplary embodiment, five speed ratios of the CVT 300 are set as five speed steps. Note that the engine speed NE of the engine 100 can be converted to the rotation speed NIN of the primary pulley 500 using the speed ratio at the torque converter 200, and therefore the primary pulley rotation speed NIN may alternatively be used as the parameter on the vertical axis of the map in FIG. 4.

In the automatic stepped shift mode, when the vehicle speed should be kept constant, the CVT 300 upshifts or downshifts non-continuously among the speed steps as indicated by the arrows in FIG. 4, for example.

Figure 5:
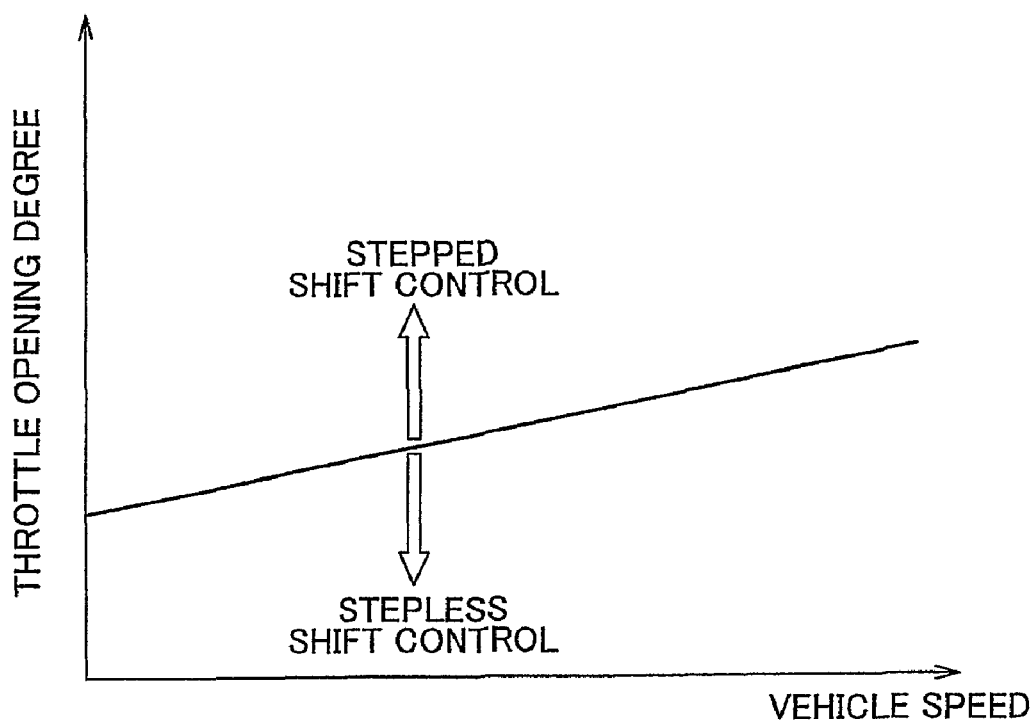
FIG. 5 is a map that is stored in the ECU in the exemplary embodiment of the invention and is used to switch the shift mode between the stepless shift mode and the automatic stepped shift mode.

Now, reference is made to FIG. 5. FIG. 5 illustrates a case in which a switchover between the stepless shift mode and the automatic stepped shift mode is made based on a map defined by the vehicle speed and the throttle opening degree, not in response to the shift lever or the shift mode switch being operated by the driver. Note that a switchover between the stepless shift mode and the automatic stepped shift mode may be triggered by either or both of the map and the operations of the shift lever and the shift mode switch.

Referring to FIG. 5, when the accelerator operation amount is large, the acceleration amount required by the driver is determined to be large and the shift control is switched from the stepless shift control (the stepless shift mode) to the stepped shift control (the automatic stepped shift mode and the manual stepped shift mode). On the other hand, when the accelerator operation amount is small, the acceleration amount required by the driver is determined to be small and the shift mode is switched from the stepped shift control to the stepless shift control. As the vehicle speed increases, the level of the throttle opening degree at which the shift control is switched from the stepless shift control to the stepped shift control raises accordingly.

Next, the control algorithm employed in the program executed by the ECT-ECU 1020, which is the control apparatus of this exemplary embodiment, will be described with reference to the flowchart of FIG. 6. The control routine in this flow chart is repeatedly executed at predetermined time intervals (e.g., 80 msec).

In step 100 ("step" will hereinafter be abbreviated to "S"), the ECT-ECU 1020 determines whether a sequential shift control (i.e., the stepped shift control including the automatic stepped shift mode and the manual stepped shift mode) is being executed. This determination is made based on the signals that are output from a shift position sensor when the shift lever is in the "M" position shown in FIG. 3. If the sequential shift control (the stepped shift control) is being executed (S100: YES), the ECT-ECU 1020 proceeds to S200. If not (S100: NO), the ECT-ECU 1020 proceeds to S300.

In S200, the ECT-ECU 1020 determines whether the cruise control is being executed. This determination is made based on the control signals that the cruise control ECU 2000 outputs to the ECT-ECU 1020. If the cruise control is being executed (S200: YES), the ECT-ECU 1020 proceeds to S300. If not (S200: NO), the ECT-ECU 1020 proceeds to S400. Typically, the cruise control is canceled in response to the driver operating the brake or the accelerator pedal.

In S300, the ECT-ECU 1020 activates the stepless shift control. In S400, on the other hand, the ECT-ECU 1020 activates the stepped shift control.

Next, a description will be made of the operation of the vehicle that is controlled by the control apparatus of this exemplary embodiment having the foregoing structure and using the foregoing control algorithm.

When the vehicle is running in a normal mode (i.e., running not under the cruise control (S200: NO)) with the shift lever being in the "M" position (S100: YES), it means that the stepped shift control is being executed, that is, one of the automatic stepped shift mode and the manual stepped shift mode is being executed (S400).

At this time, if the driver turns on a cruise control switch provided on the steering wheel of the vehicle (S100: YES, S200: YES), the shift control is then switched to the stepless shift control (S300).

Thus, when the cruise control is activated while the CVT 300 is operating under the stepped shift control (including the automatic stepped shift mode and the manual stepped shift mode), the shift control of the CVT 300 is then switched to the stepless shift control, so that the CVT 300 starts continuously shifting, not non-continuously. In particular, during the cruise control, the drive torque is required independent of the driver's operation (i.e., the operation of the accelerator pedal or the brake pedal), and therefore, if the stepped shift control is continued, the CVT 300 may repeat upshifting or downshifting from one speed step to the other (busy shifts). Therefore, in this exemplary embodiment, the shift control of the CVT 300 is switched from the stepped shift control to the stepless shift control in response to the cruise control being activated, so that the CVT 300 smoothly shifts according to the requirements from the cruise control ECU 2000 to drive the vehicle at a constant speed without undergoing busy shifts.

When the cruise control is cancelled (when the driver operates the brake pedal or the accelerator pedal, or when the driver turns off the cruise control switch on the steering wheel), the stepped shift control resumes, so that the drive can restart the manual shifting.

(Other Examples)

Other examples of the forgoing control apparatus will be described with reference to FIGS. 7A and 7B. In the exemplary embodiment described above, when the cruise control is activated while the CVT 300 is operating under the stepped shift control, the shift control of the CVT 300 is switched to the stepless shift control. Alternatively, the CVT 300 may be controlled as follows.

Figure 7A:
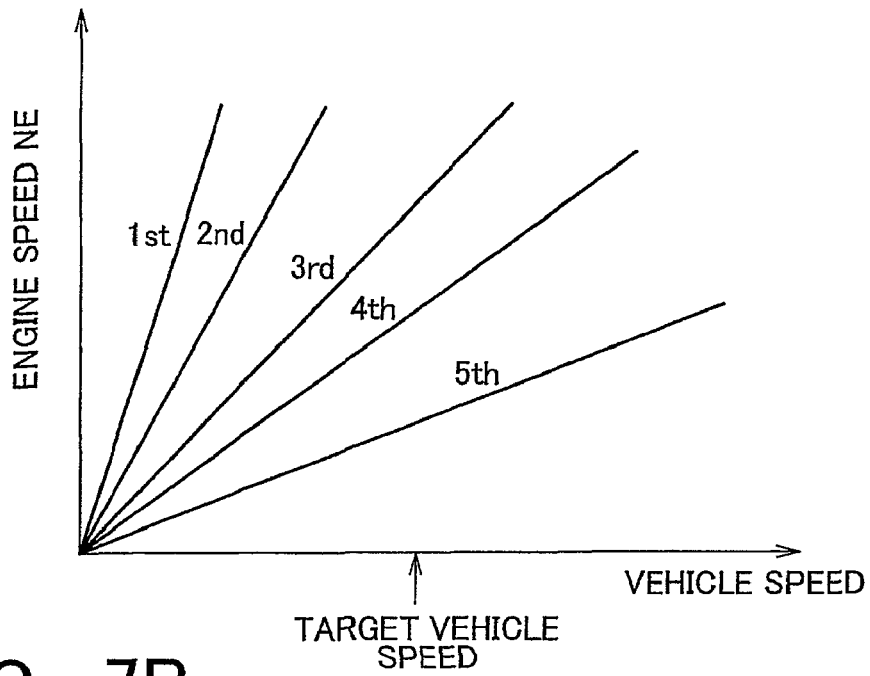
FIG. 7A.
Figure 7B:
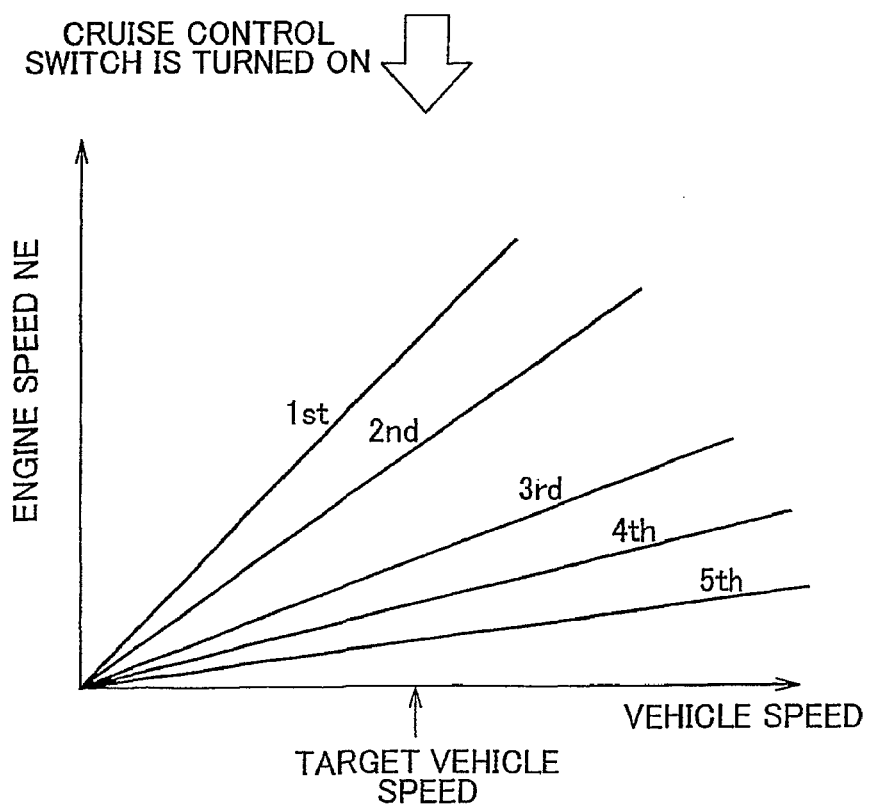
FIG. 7B are shift maps (for stepped shift control) stored in the ECU in the exemplary embodiment of the invention.

In the example shown in FIG. 7A, 7B, when the cruise control is activated (when the cruise control switch is turned on), the speed ratios of the CVT 300 that are used as the respective speed steps are changed so as to be closer to each other according to the target vehicle speed (set vehicle speed) of the cruise control. This reduces the amount of change in the drive power that occurs each time the CVT 300 shifts from one speed step to the other. In this case, therefore, even if the CVT 300 undergoes busy shifts between the speed steps, the driver would not feel uncomfortable.

Further, the shift control of the CVT 300 may be switched between the stepped shift control and the stepless shift control during the cruise control under conditions other than that defined by the map in FIG. 5. For example, a map that describes a larger region of the stepless shift control than that in the map of FIG. 5 may be used during the cruise control.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the appended claims.

The invention claimed is:

1. A shift control apparatus for a continuously variable transmission, comprising:
    a shift mode switching device that selectively switches the shift mode of the continuously variable transmission between a stepless shift mode and a stepped shift mode in which the continuously variable transmission shifts non-continuously using a plurality of speed steps that are provided as predetermined speed ratios of the continuously variable transmission;
    a command device that issues commands for upshift and downshift of the continuous variable transmission during the stepped shift mode;
    a shift control device that, in response to the commands from the command device, controls the continuously variable transmission to shift from the present speed step to the next speed step during the stepped shift control; and
    a determination device that determines whether a request for a cruise control is being made, wherein
    the shift mode switching device includes a device that switches the shift mode of the continuously variable transmission from the stepped shift mode to the stepless shift mode in response to a request for the cruise control being made during the stepped shift mode.

2. The shift control apparatus according to claim 1, wherein the shift mode switching device includes a device that switches the shift mode of the continuously variable transmission from the stepped shift mode to the stepless shift mode in response to a request for the cruise control being made during the stepped shift mode, and that switches the shift mode of the continuously variable transmission from the stepless shift mode back to the stepped shift mode in response to the request for the cruise control being cancelled.

3. The shift control apparatus according to claim 1, wherein the command device includes a device that issues commands for upshift and downshift of the continuously variable transmission based on a predetermined condition, regardless of shift operations by a driver.

4. The shift control apparatus according to claim 1, wherein the command device includes a device that issues commands for upshift and downshift of the continuously variable transmission based on manual operations by a driver.

5. A shift control apparatus for a continuously variable transmission, comprising:
    a shift mode switching device that selectively switches the shift mode of the continuously variable transmission between a stepless shift mode and a stepped shift mode in which the continuously variable transmission shifts non-continuously using a plurality of speed steps that are provided as predetermined speed ratios of the continuously variable transmission;
    a command device that issues commands for upshift and downshift of the continuous variable transmission during the stepped shift mode;
    a shift control device that, in response to the commands from the command device, controls the continuously variable transmission to shift from the present speed step to the next speed step during the stepped shift control; and
    a determination device that determines whether a request for a cruise control is being made, wherein
    the shift mode switching device includes a device that, in response to a request for a cruise control being made, changes the speed ratios of the speed steps so as to be closer to each other according to a target vehicle speed of the cruise control.

6. A shift control method for a continuously variable transmission, comprising:
    selectively switching the shift mode of the continuously variable transmission between a stepless shift mode and a stepped shift mode in which the continuously variable transmission shifts non-continuously using a plurality of speed steps that are provided as predetermined speed ratios of the continuously variable transmission;
    issuing commands for upshift and downshift of the continuous variable transmission during the stepped shift mode;
    controlling, in response to the commands, the continuously variable transmission to shift from the present speed step to the next speed step during the stepped shift control;
    determining whether a request for a cruise control is being made; and
    switching the shift mode of the continuously variable transmission from the stepped shift mode to the stepless shift mode in response to a request for the cruise control being made during the stepped shift mode.

7. A shift control method for a continuously variable transmission, comprising:
    selectively switching the shift mode of the continuously variable transmission between a stepless shift mode and a stepped shift mode in which the continuously variable transmission shifts non-continuously using a plurality of speed steps that are provided as predetermined speed ratios of the continuously variable transmission;
    issuing commands for upshift and downshift of the continuous variable transmission during the stepped shift mode;
    controlling, in response to the commands, the continuously variable transmission to shift from the present speed step to the next speed step during the stepped shift control;
    determining whether a request for a cruise control is being made; and
    changing, in response to a request for a cruise control being made, the speed ratios of the speed steps so as to be closer to each other according to a target vehicle speed of the cruise control.

8. The shift control apparatus according to claim 2, wherein the command device includes a device that issues commands for upshift and downshift of the continuously variable transmission based on a predetermined condition, regardless of shift operations by a driver.

9. The shift control apparatus according to claim 2, wherein the command device includes a device that issues commands for upshift and downshift of the continuously variable transmission based on manual operations by a driver.

* * * * *